US010048452B1

(12) United States Patent
Hangebrauck et al.

(10) Patent No.: US 10,048,452 B1
(45) Date of Patent: Aug. 14, 2018

(54) SYSTEM AND METHOD FOR JOINING AND DISTRIBUTING A SINGLE OPTICAL FIBER CABLE TO MULTIPLE RACK SHELVES

(71) Applicant: Sumitomo Electric Lightwave Corp., Raleigh, NC (US)

(72) Inventors: Daniel Brian Hangebrauck, Garner, NC (US); Craig Steven Potter, Cary, NC (US); Daniel Frederick Oberklein, Cary, NC (US); Patrick Stephen VanVickle, Apex, NC (US)

(73) Assignee: Sumitomo Electric Lightwave Corp., Raleigh, NC (US)

( * ) Notice: Subject to any disclaimer, the term of this patent is extended or adjusted under 35 U.S.C. 154(b) by 0 days.

(21) Appl. No.: 15/826,188

(22) Filed: Nov. 29, 2017

Related U.S. Application Data

(63) Continuation of application No. 15/635,656, filed on Jun. 28, 2017.

(51) Int. Cl.
*G02B 6/38* (2006.01)
*G02B 6/44* (2006.01)

(52) U.S. Cl.
CPC ......... *G02B 6/3897* (2013.01); *G02B 6/3894* (2013.01); *G02B 6/4446* (2013.01); *G02B 6/4452* (2013.01)

(58) Field of Classification Search
CPC .. G02B 6/3897; G02B 6/3894; G02B 6/4446; G02B 6/4452
See application file for complete search history.

(56) References Cited

U.S. PATENT DOCUMENTS

| | | | |
|---|---|---|---|
| 4,717,231 A | 1/1988 | Dewez et al. |
| 4,765,709 A | 8/1988 | Suillerot et al. |
| 5,046,811 A | 9/1991 | Jung et al. |
| 5,071,220 A | 12/1991 | Ruello et al. |
| 5,212,761 A | 5/1993 | Petrunia |
| 5,933,563 A | 8/1999 | Schaffer et al. |

(Continued)

FOREIGN PATENT DOCUMENTS

| | | |
|---|---|---|
| JP | 2002372634 A | 12/2002 |
| KR | 20060111757 A | 10/2006 |
| WO | WO 2017/046185 A2 | 3/2017 |

OTHER PUBLICATIONS

"Ultima LC IP56 Fibre Breakout Boxes: 16 Way IP56 Box SingleMode LC 4x Quad Breakout Box Grey," Comtec, https://www.comtecdirect.co.uk/product/ultima-lc-ip56-fibre-breakout-boxes/PG3027/788014, pp. 1-4, retrieved May 8, 2017.

(Continued)

*Primary Examiner* — Ryan Lepisto
(74) *Attorney, Agent, or Firm* — Jenkins, Wilson, Taylor & Hunt, P.A.

(57) ABSTRACT

A breakout box, breakout box system, and method for management of optical fibers. The breakout box system provides a pass-through system for connecting optical fibers to network rack modules. The external routing of incoming and outgoing cables around the rack is kept neat and orderly, with one large cable serving a plurality of shelves. The breakout of the cable and distribution of the fibers to the individual modules occurs inside the breakout boxes and bridges, which provide protection for the fibers while still allowing easy access for fiber handling by means of the removable lids.

22 Claims, 8 Drawing Sheets

(56) References Cited

U.S. PATENT DOCUMENTS

| | | | |
|---|---|---|---|
| 5,945,633 | A | 8/1999 | Ott et al. |
| 6,166,331 | A | 12/2000 | Sjölinder et al. |
| 6,322,178 | B1 | 11/2001 | Dominique |
| 6,379,166 | B1 | 4/2002 | Hagarty et al. |
| 6,538,904 | B1 | 3/2003 | Isely et al. |
| 7,266,281 | B1 | 9/2007 | Flatau |
| 7,583,885 | B2 | 9/2009 | Kowalezyk et al. |
| 8,208,779 | B2 | 6/2012 | Bonicel |
| 8,472,775 | B2 | 6/2013 | Corbille et al. |
| 8,628,157 | B2 | 1/2014 | Burek et al. |
| 8,660,398 | B2 | 2/2014 | Abbiati |
| 8,848,347 | B2 | 9/2014 | Doorn et al. |
| 9,008,483 | B2 | 4/2015 | Larsson et al. |
| 9,069,151 | B2 | 6/2015 | Conner |
| 9,279,951 | B2 | 3/2016 | McGranahan et al. |
| 9,389,384 | B2 | 7/2016 | Solheid et al. |
| 9,490,929 | B2 | 11/2016 | Badinelli |
| 9,500,830 | B2 | 11/2016 | Lu et al. |
| 9,559,499 | B2 | 1/2017 | Alvarez |
| 2010/0195969 | A1 | 8/2010 | Kennedy et al. |
| 2011/0129185 | A1 | 6/2011 | Lewallen et al. |
| 2011/0164854 | A1 | 7/2011 | Desard et al. |
| 2013/0183012 | A1 | 7/2013 | Cabanne Lopez et al. |
| 2015/0378122 | A1* | 12/2015 | Simmons ............... H01R 27/02 439/529 |

OTHER PUBLICATIONS

Non-Final Office Action for U.S. Appl. No. 15/635,656 dated Dec. 18, 2017.

* cited by examiner

FIG. 7A     FIG. 7B

SYSTEM AND METHOD FOR JOINING AND DISTRIBUTING A SINGLE OPTICAL FIBER CABLE TO MULTIPLE RACK SHELVES

TECHNICAL FIELD

The present subject matter relates generally to optical fiber communication networks, devices, and/or methods and, more particularly, to data centers, devices, and/or related methods.

BACKGROUND

Optical fibers are used in various types of communication networks. In a typical optical fiber communication network, a large bundle of optical fibers is separated into smaller bundles (e.g., cables) and routed to any of a plurality of network racks. At each rack these smaller cables are then further separated into groupings that are distributed to network modules or "shelves" mounted in these network racks. These network modules are typically sized according to a standardized rack unit (RU) equal to 1.75" tall. A standard rack can hold several dozen network modules, creating many separation points for the optical fiber cable.

Working with these large bundles of optical fiber poses a challenge in routing and handling of the optical fibers, which can be prone to breakage from improper handling or management. A single large incoming bundle of optical fibers is frequently routed along the outside of the rack, with individual optical fibers separated from the bundle at each network module. The optical fibers can be unwieldy and easily damaged, leading to additional installation time and cost from improper handling and/or installation. As such, a need presently exists for improved devices and methods of ensuring optical fibers are maintained in an orderly and protected fashion during installation.

SUMMARY

Optical fiber network devices, systems, and related methods are provided herein. These devices and systems can provide an improved method for joining and distributing an optical fiber cable to multiple network rack modules.

Devices and systems disclosed herein provide a new way to route optical fibers into multiple rack shelves while minimizing clutter and providing protection for the fibers. Breakout boxes can advantageously mount to one or more shelf or shelves, and can in some aspects mount to network rack shelves or modules such as for example at the rear corner of the shelves, accommodating shelf designs that have front and rear sliding capability. Additionally, shelves having rear doors are compatible with a breakout box system, which can be assembled so as not to obstruct the rear of the shelf. The modular nature of the system, together with bridges of various lengths, provides flexibility to adapt the system to multiple configurations of rack shelves and fiber count needs. Furthermore, the system is not limited solely to optical fiber networks, but can also be used for a variety of cable routing scenarios.

With a system as disclosed herein, the routing of incoming and outgoing cables around the rack is kept neat and orderly, with one large cable serving a plurality of shelves. The breakout of the cable and distribution of the fibers to the individual shelves occurs inside the breakout boxes and bridges, which provide protection for the fibers while still allowing easy access for fiber handling by the removable lids.

In some aspects, optical fiber cables can be distributed to network rack modules by an optical fiber breakout box. The breakout box can have a base section with three walls, and a removable cover that has a threaded ferrule on an inlet opening. The rear wall of the breakout box has several exit openings to provide a passageway that connects the optical fibers with the rack modules. There can be an additional opening in the breakout box to pass through any optical fibers that are not being routed to the network modules.

In other aspects, multiple optical fiber breakout boxes can be part of a system, where a plurality of breakout boxes can connect to one another via bridges. The bridges are enclosed to provide a continuous, protected path for routing fibers to each shelf spanned by the chained boxes.

BRIEF DESCRIPTION OF THE DRAWINGS

A full and enabling disclosure of the present subject matter is set forth more particularly in the remainder of the specification, including reference to the accompanying figures (also, "figs.") that are given merely by way of explanatory and non-limiting example, relating to one or more example embodiments, in which.

DETAILED DESCRIPTION

The present subject matter provides optical fiber breakout devices, systems, and methods capable of improving ease of installation of optical fibers in optical fiber communication networks, specifically in optical fiber network racks. In this way, the devices, systems, and methods disclosed herein can be used to reduce installation time and cost, as well as to aid in preventing damage to the optical fibers while they are segregated from the larger optical fiber bundle and connected to respective and/or corresponding rack modules within the network rack associated with the optical fiber bundle.

Specifically, for example, in one aspect, the present subject matter provides a solution to allow for separation and "breakout" of individual fibers from a larger optical fiber bundle.

Figure 1:
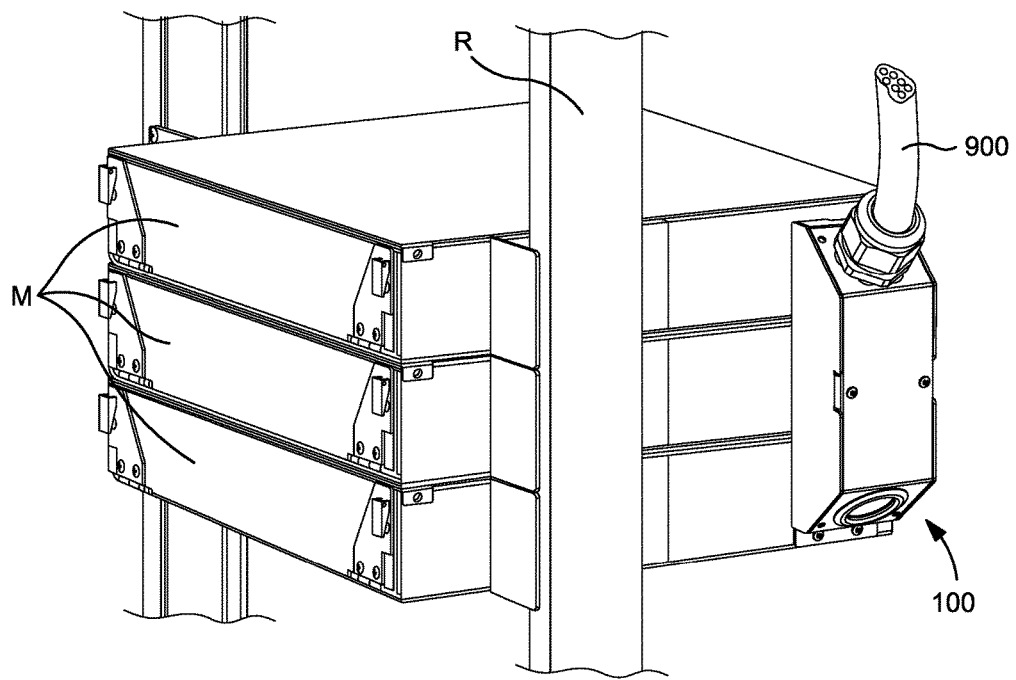
FIG. 1 is a perspective view of an embodiment of an optical fiber breakout box assembled in a network rack.

In one aspect, an example embodiment of a breakout box, generally designated 100, for optical cables is shown, in FIG. 1, mounted to network modules M (e.g., "shelves") mounted in network rack R. In a typical network application, an optical fiber cable 900 is supplied to a network rack R from an area above the rack aisle, and cable 900 is sized (e.g., has a certain number of optical fibers) according to the number of network modules M installed in rack R. For example, in the embodiment shown in FIG. 1, optical fiber cable 900 has 864 fibers that provide 288 fibers to each of the three network modules M. Because every connection or fiber splice introduces potential losses in terms of signal strength and sources of noise, it is desirable to use continuous, uninterrupted fibers whenever possible. An installer must therefore use considerable care in handling optical fiber cable 900 as it is fed into network rack R. A breakout box 100 according to this example embodiment is configured to protect the individual fibers within optical fiber cable 900, as these individual fibers are routed alongside and separated into network modules M.

Breakout box 100 is mounted directly to network modules M on network rack R. Breakout box 100 accepts optical fiber cable 900 on a first (e.g., upper) side, as shown in FIG. 1. Inside breakout box 100, individual fibers are separated into groups. The groups of fibers are then fed through exit openings in a module-facing (e.g., rear) side of breakout box 100. One breakout box 100 can service, for example, three network modules M. However, it can also be envisioned that breakout box 100 can be configured to provide optical fibers to other numbers (e.g., one, two, four, five, or six or more) of network modules M. Any excess fibers not assigned to be connected to network modules M, to which breakout box 100 is attached at the module-facing side thereof, can be fed through a second (e.g., lower) side of breakout box 100 to be provided to other network modules installed elsewhere (e.g., above or below) in another portion of rack R.

In some embodiments, it is advantageous for breakout box 100 to be mounted on a rear side panel of module M in a position so that network modules M to be movable. Many conventional types of network modules M are designed to slide forward or backward to access the interior of the network module. Breakout box 100 is thus configured to allow network module M, or a section thereof, to travel without interfering with such translator motion or with cooling airflow paths, which typically flow in a front-to-back direction.

Figure 2:
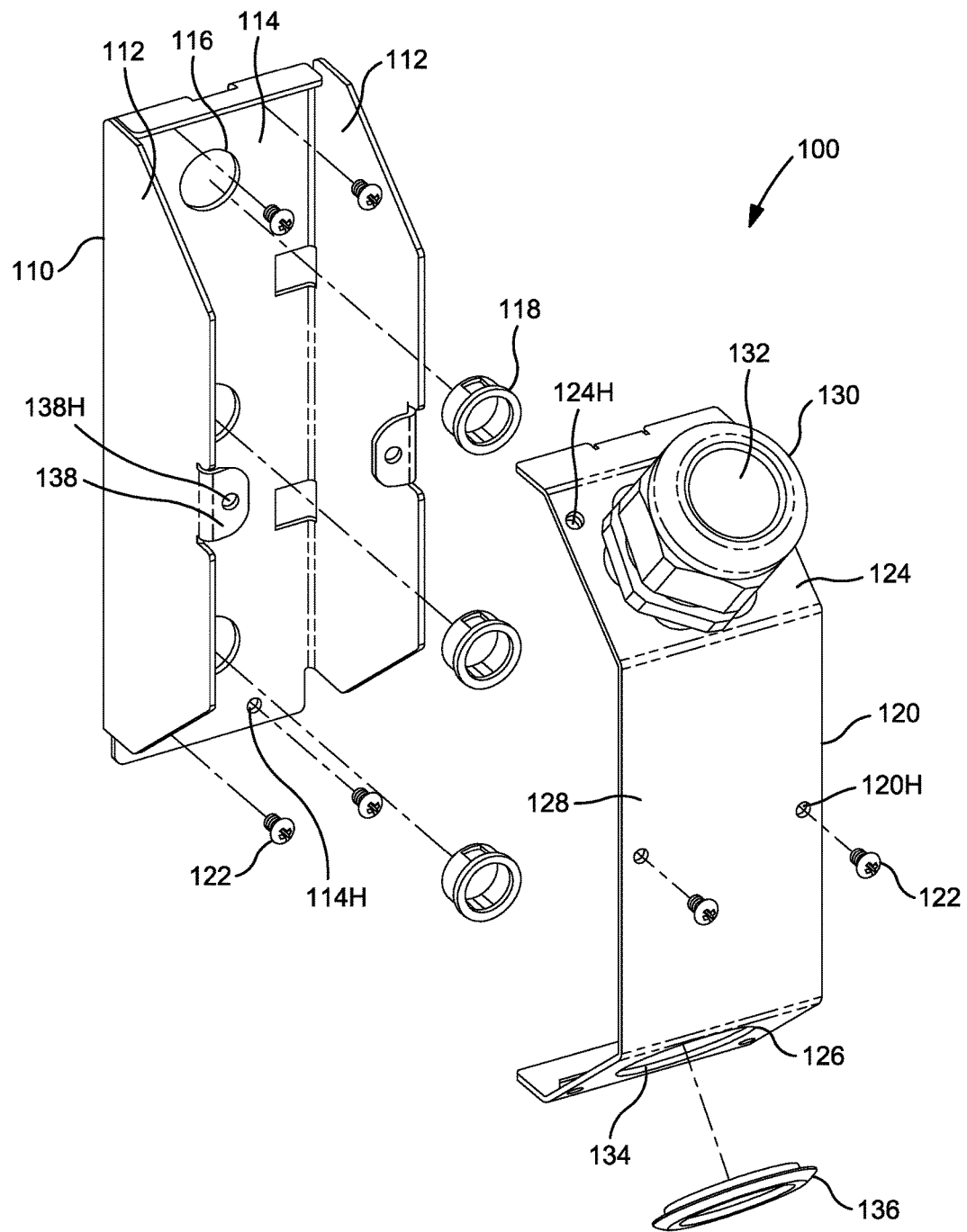
FIG. 2 is an exploded view of the embodiment of the optical fiber breakout box of FIG. 1.
Figure 3:
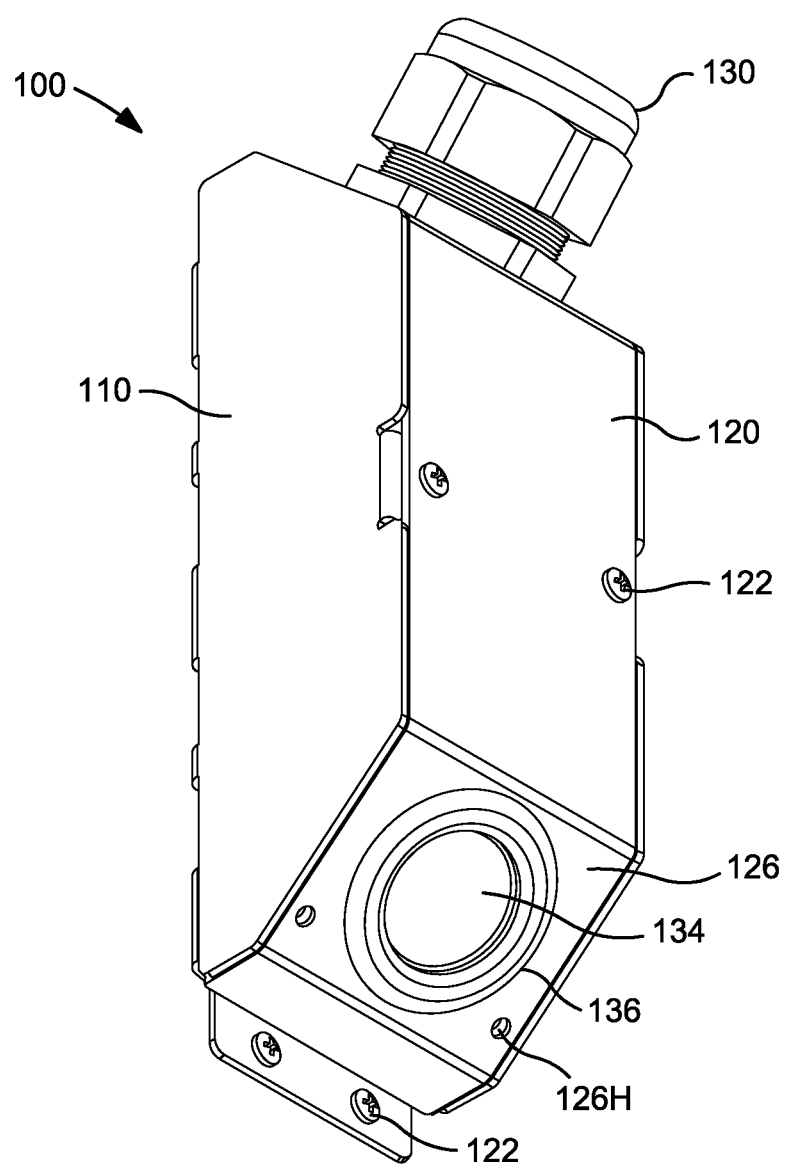
FIG. 3 is a perspective view of the embodiment of the breakout box of FIG. 1.
Figure 4:
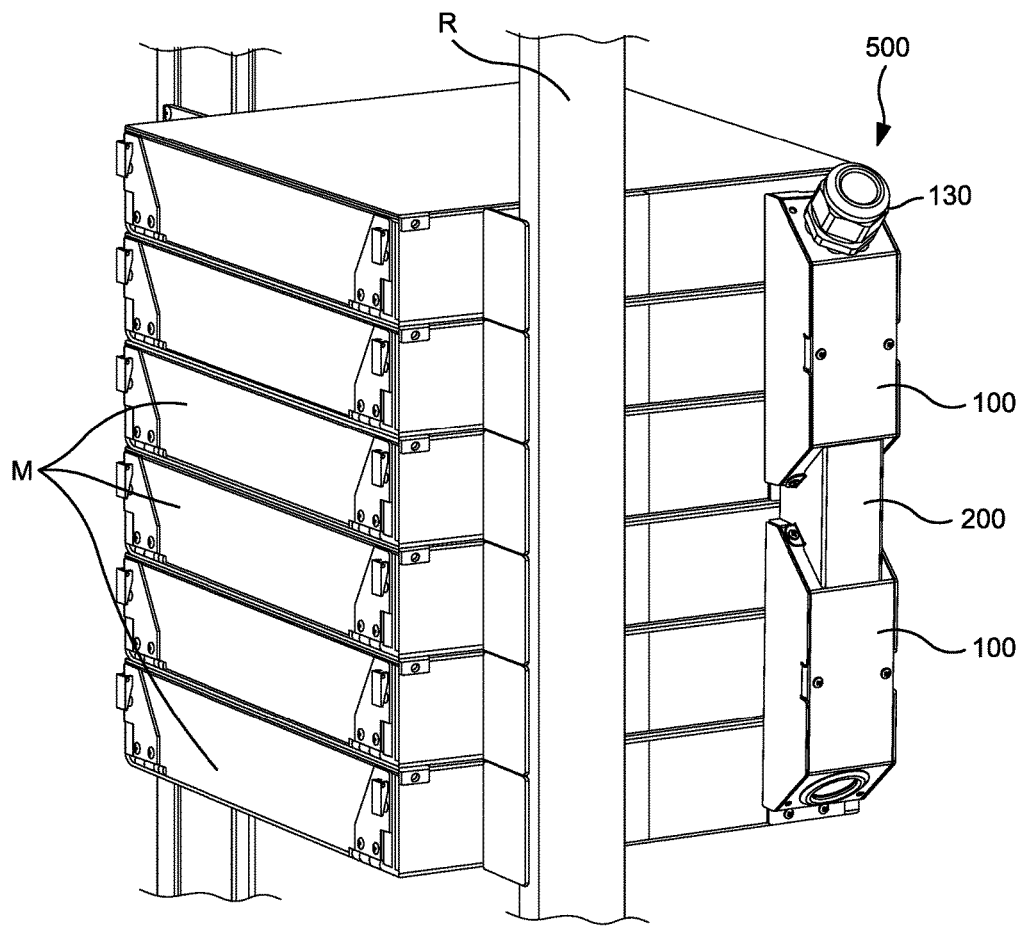
FIG. 4 is a perspective view of an embodiment of an optical fiber breakout box system assembled in a network rack.

Referring to FIGS. 2 and 3, greater detail of breakout box 100 is shown in the exploded view of FIG. 2 and the perspective assembled view of FIG. 3. There are two main portions of breakout box 100: a base section 110 and a removable cover 120. Base section 110 has two lateral side walls 112, which are shown attached on either side of a rear wall 114, which is configured to be mounted against the network modules to which the optical fibers are being provided (see, e.g., FIG. 1). Side walls 112 as shown have a substantially trapezoidal shape, such that the cross-sectional shape (e.g., width or height, as shown in FIG. 2) of side walls 112 decreases as the distance away from rear wall 114 increases. Other configurations and shapes are envisioned as well. Rear wall 114 is substantially flat along a height thereof, with an optional flange at the top and bottom of rear wall 114 for added structural rigidity. Rear wall 114 has one or more exit openings 116 formed therein for the passage of optical fibers from the optical fiber bundle (see, e.g., 900 in FIG. 1). Rear wall 114 can have a plurality, e.g., two, three, or more of exit openings 116 formed therein. Rear wall 114 can have any number of exit openings 116 formed therein, the number being dependent on the number of network modules to which breakout box 100 is to be connected. In some embodiments, protective inserts 118 are provided in one or more of exit openings 116 in order to protect optical fibers passing into a network module from damage, which may occur during installation or during operation, particularly if modules M are configured to slide.

These protective inserts 118 can be made of any suitable non-abrasive material (e.g., rubber, silicone, plastic, and the like) Exit openings 116 are shown as having a circular cross-sectional shape, but any suitable cross-sectional shape can be selected for exit openings 116. In some embodiments where a network rack may have an empty space where a network module is not installed, exit openings 116 may include a cover (e.g., a rubber grommet or any suitable plug) that fills exit openings 116 at the empty spot within the network rack.

Removable cover 120 is formed to fit the shape and/or profile (e.g., trapezoidal) of side walls 112, having a first angled surface 124, a second angled surface 126, and a central surface 128 connected between the first and second angled surfaces 124 and 126. Side walls 112 have at least one mounting tab 138 formed therein, with internally threaded mounting holes formed so that base section 110 can be securely attached to removable cover 120 by screws 122 passing through corresponding holes formed in central portion 126 of removable cover 120. While the at least one mounting tab 138 is shown as having internally threaded holes 138H disposed thereon, such that base section 110 is configured to be securely mounted (e.g., fixed) to cover 120 by one or more (e.g., a plurality of) screws 122, any suitable fastening arrangement can be used. At least one inlet opening (e.g., a first opening) 132 is formed in and/or through a thickness of first angled surface 124. A device known as a cable gland, which can also be described as a threaded ferrule 130, is also disposed on, secured to, and/or formed integral to first angled surface 124, such that inlet opening 132 passes through threaded ferrule 130, aligned along the longitudinal axis of threaded ferrule 130. Threaded ferrule 130 is configured to receive an incoming optical fiber cable (see, e.g., 900, FIG. 1) and also to prevent excess bending (e.g., bending in excess of a specified minimum bend radius for cable bundle 900) and to lock the cable bundle in place relative to network modules M and/or breakout box 100. This locking in place can be accomplished, for example, by threadably installing (e.g., screwing on) of a first part of threaded ferrule 130 over a second part of threaded ferrule 130, wherein the second part of threaded ferrule 130 is configured to remain secured to first angled surface 124 while the first part of threaded ferrule 130 is threadably engaged with and/or disengaged from the second part of threaded ferrule 130.

Breakout box 100 also has a second opening 134 formed in and/or through a thickness of second angled surface 126. Second opening 134 can be omitted in some embodiments, such as, for example, where breakout box 100 is disposed at a terminal end (e.g., the last, such as a top or bottom) of the optical fiber bundle servicing the network modules within the network rack. Second opening 134 is configured as an exit for optical fibers of the large optical fiber cable bundle (e.g., 900, FIG. 1) which are not designated for connection to network modules, to which breakout box 100 is attached. These non-designated optical fibers are thus routed out of second opening 134 to another breakout box, for example, or to another area of the network rack. A protective insert 136 is located within second opening 134 to prevent damage to optical fibers on the edges of second opening 134, as these optical fibers pass therethrough. Protective insert 136 may be omitted in some embodiments, such as, for example, where the optical fibers have their own protective sheathing. In some embodiments, protective insert 136 is configured as a plug to block the passage of objects through second opening 134. Base section 110 is connected to rack modules by, for example, holes 114H provided in rear wall 114 of base section 110 by threaded screws 122, which are configured to threadably engage with threaded features in the network modules to which breakout box 100 is attached.

Referring to FIGS. 4 through 8, various example embodiments of breakout box systems are shown where optical cable bundle (e.g., 900, FIG. 1) contains optical fibers that are designated for other network modules, which pass through second opening 134. In the embodiment shown in FIG. 4, a breakout box system, generally designated 500, includes two or more breakout boxes 100 connected to one another by a bridge 200. Bridge 200 is configured to fit between breakout boxes 100, such that the optical fibers housed therein are substantially completely enclosed (e.g., closed to prevent physical intrusion, but not necessarily hermitically sealed) within breakout box system 500. Breakout box system 500 is configured to be mounted in a network rack R and connected to a plurality of network modules M. Network modules M are located adjacent to one another. Network shelves are typically arranged according to Rack Units (RU), with mounting points in 1 RU increments. Bridge 200 provides enclosed connection to groups of network modules M with substantially no spacing therebetween (e.g., 0 RU, but clearance and/or tolerance gaps, such as 1 mm, 2 mm, 3 mm, and the like are permitted). In the example embodiment of FIG. 4, six network modules M are shown, but other quantities of network modules M are possible, up to and including all network modules M installed in network rack R.

Figure 5:
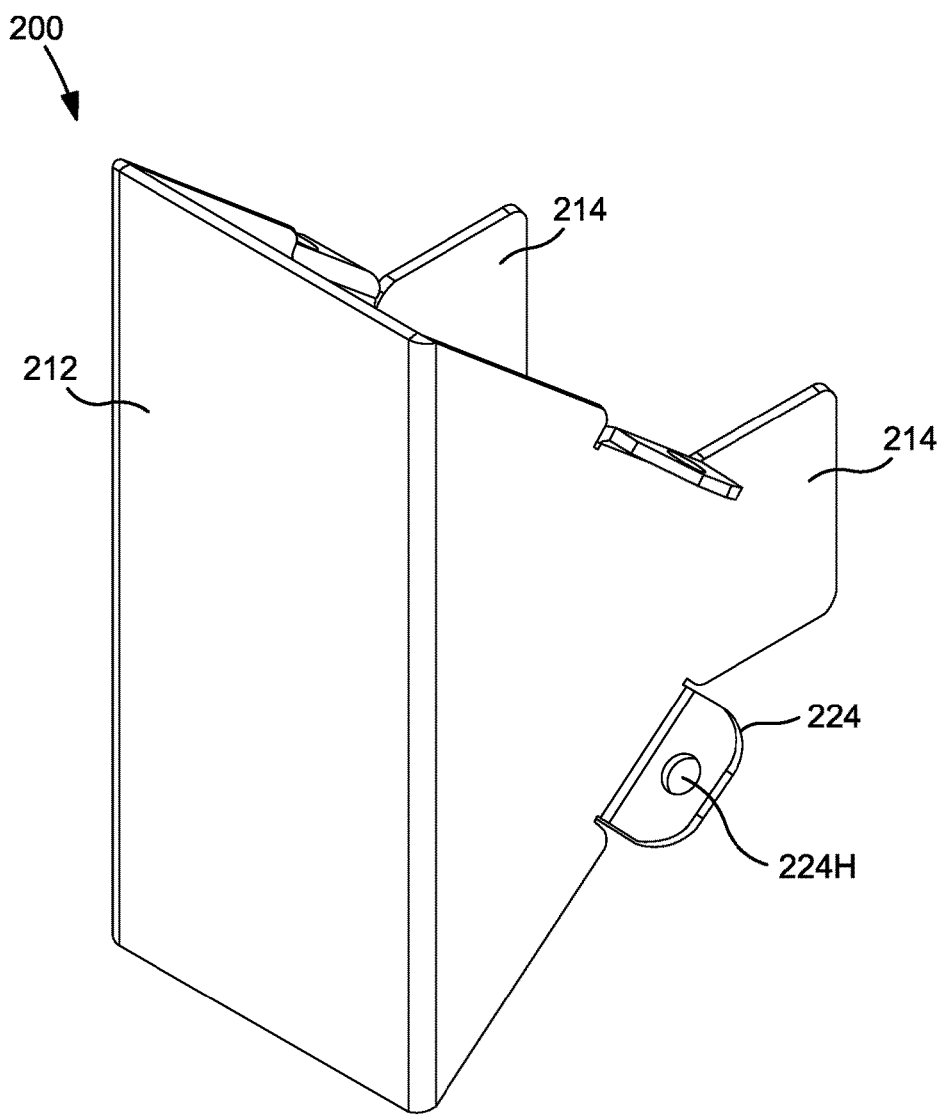
FIG. 5 is a perspective view of an example embodiment of a bridge component of the optical fiber breakout system shown in FIG. 5.

Referring to FIG. 5, detailed view of a first embodiment of a bridge, generally designated 200, is illustrated. Bridge 200 has a front wall 212 and two lateral side walls 214 attached at the outer edges of front wall 212. In some embodiments, side walls 214 can be inset and attached to front wall 212 at a location within the perimeter of front wall 212, such that a portion of front wall 212 protrudes beyond side walls 214, forming a flange for additional structural support, as well as a potential gripping section. Side walls 214 are configured to contact outer surfaces of first and second angled surfaces 124 and 126 of breakout box 100 (see, e.g., FIG. 7A) and therefore have a complementary profile disposed at a substantially similar angle to form substantially continuous interface region therebetween. Bridge 200 is configured to be attached to one or more adjacent breakout boxes (see, e.g., 100, FIG. 7A) by, for example tabs 224, which are integrally formed in and/or on side walls 214. Tabs 224 are arranged so as to be substantially orthogonal (e.g., 90°+/−10°, 5°, 2°, or 1°) to a plane defined a side walls 214 to which each tab 224 is respectively attached, and are substantially parallel to a plane of the first or second angled surface (see, e.g., 124 and 126, FIGS. 2 and 3). Tabs 224 have holes 224H formed therein (e.g., through a thickness of tab 224). Holes 224H are located so as to be substantially aligned with threaded holes (see, e.g., 126H, FIG. 3) formed in angled surfaces 124 and 126 of breakout box 100 (see, e.g., FIG. 7A) and are secured to an adjacent breakout box 100 by threadably engaging a screw 122 through each hole 324 in each tab 324 and into threaded holes (see, e.g., 126H, FIG. 3) of the adjacent breakout box 100 (see, e.g., FIG. 7B). Other types of fasteners and types of attachment will be readily understood by those having ordinary skill in the art.

Figure 6:
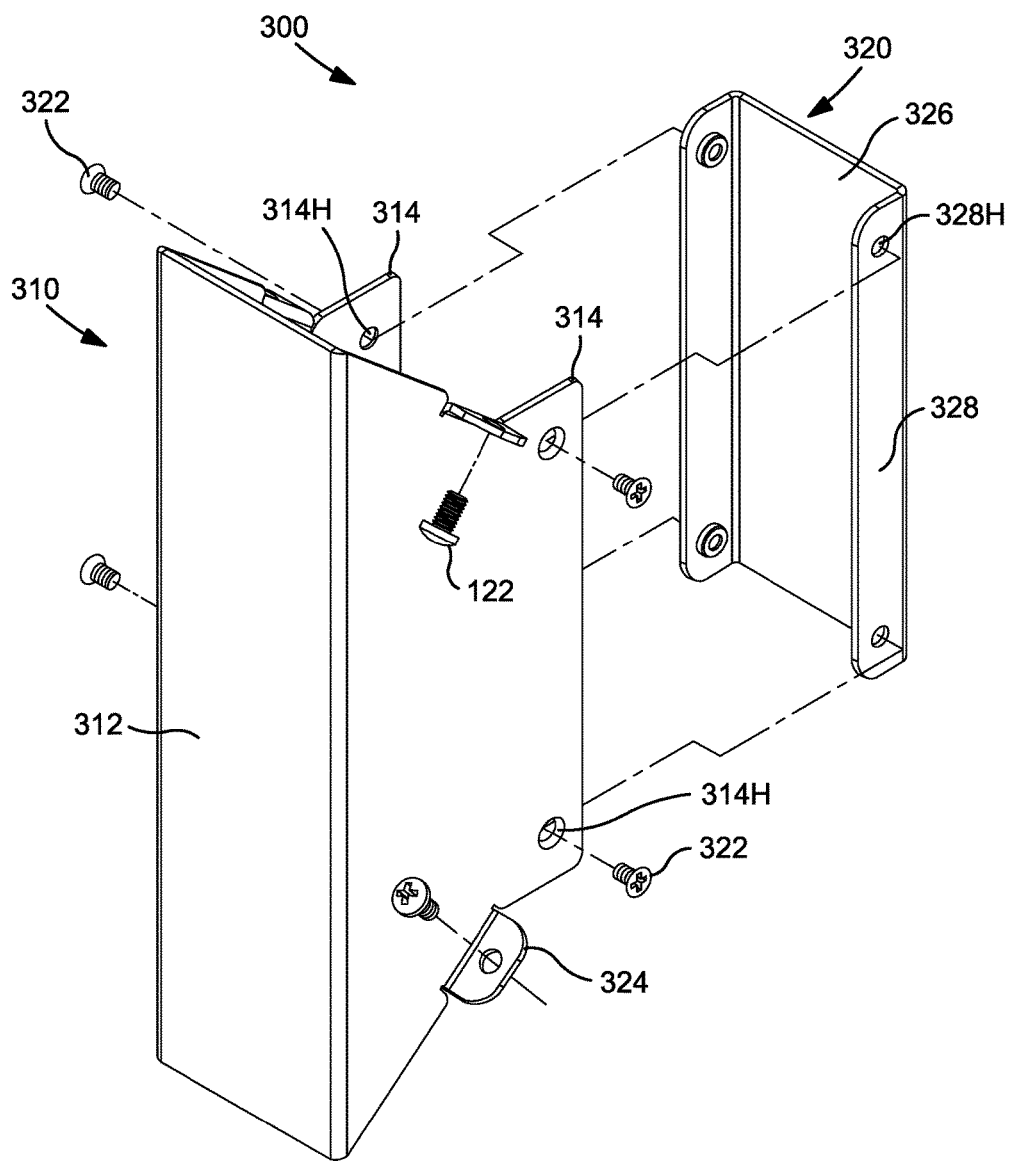
FIG. 6 is an assembly view of another example embodiment of a bridge component for use in an optical fiber breakout system.
Figure 7:
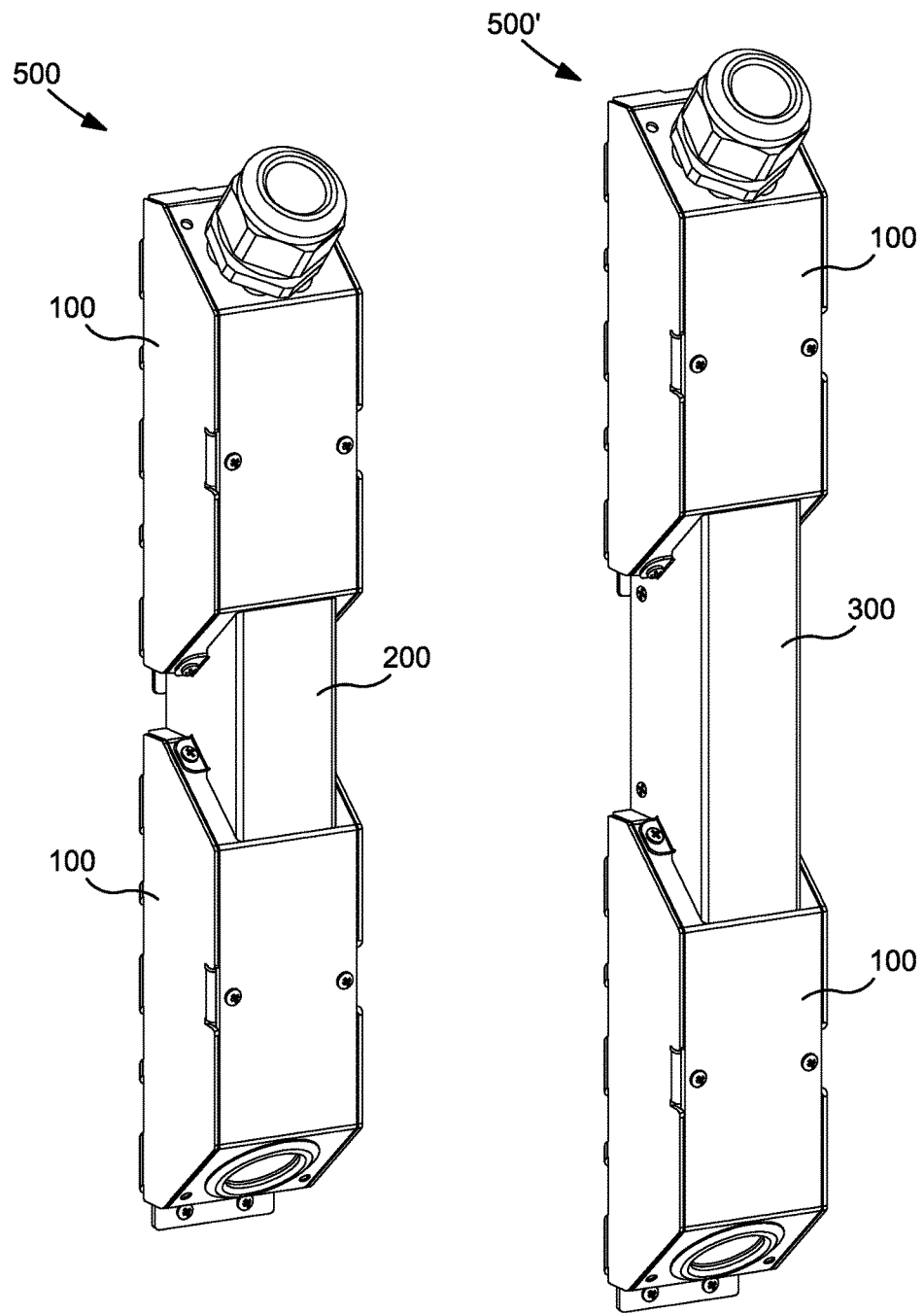
FIGS. 7A and 7B are perspective views of different example embodiments of optical fiber breakout systems.
Figure 8:
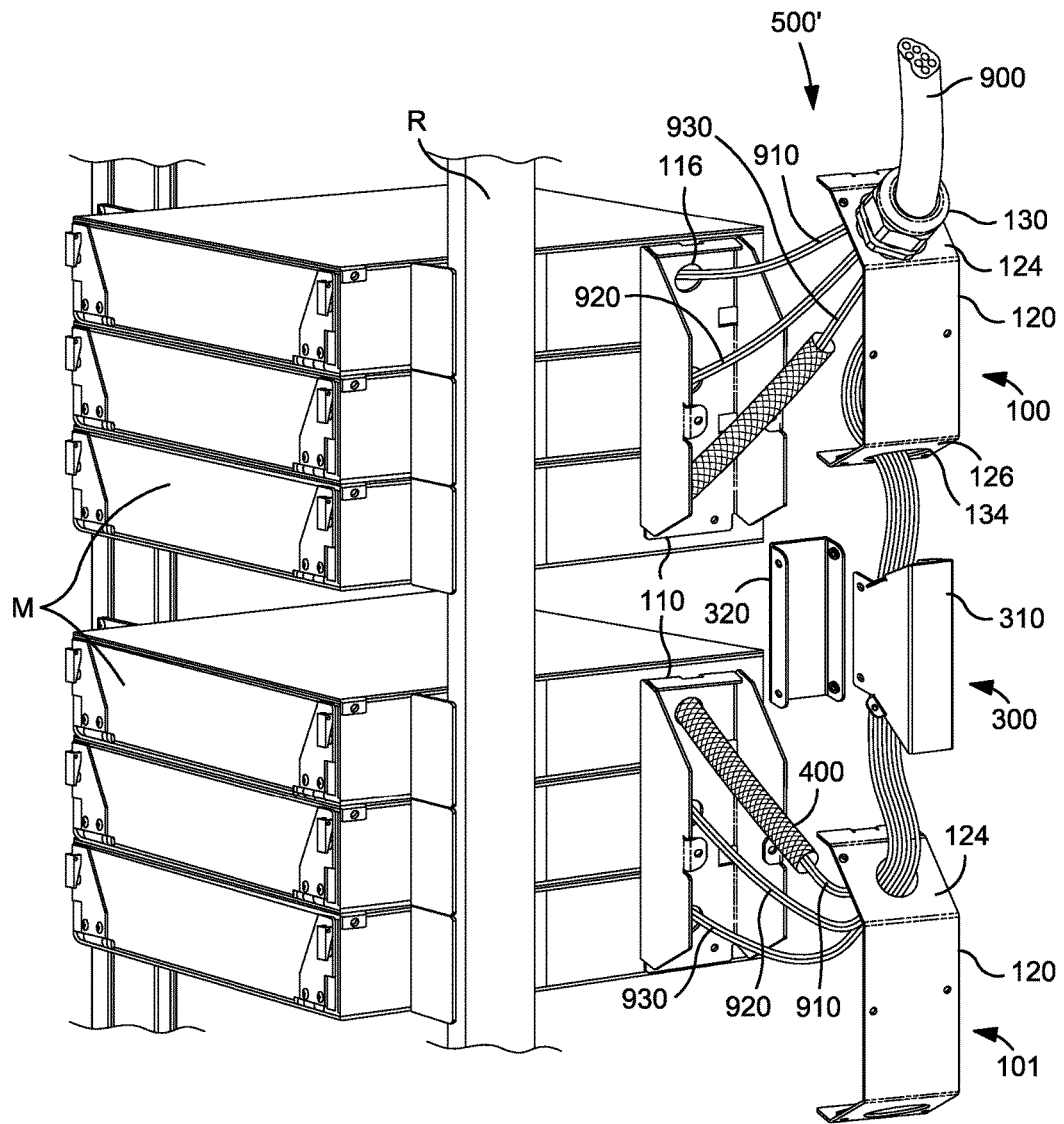
FIG. 8 is an assembly view of another embodiment of an optical fiber breakout system assembled in a network rack.

Referring to FIGS. 6, 7B, and 8, another example embodiment is shown, where network modules M are not arranged and/or installed directly adjacent to one another in network rack R. In such embodiments, an alternative bridge, generally designated 300 in FIG. 6, is used to form an alternate embodiment of a breakout box system, generally designated 500' in FIG. 7B.

Referring to FIG. 6, a bridge, generally designated 300, is used to connect network modules that are spaced apart on a network rack. Bridge 300 is, according to some embodiments, a longer version of bridge 200 (see, e.g., FIG. 5) and can be designed, in some embodiments, to connect network modules that are separated by, for example, 0.5 RU, 1 RU, 2 RU, or more. While it is contemplated that bridge 300 may have a telescoping feature to provide an adjustable length, in the embodiment shown in FIGS. 6, 7B, and 8, bridge 300 has a fixed length, but the length of bridge is selected to correspond to the gap between adjacent network modules in a network rack. Because bridge 300 spans a longer distance as well as a gap, through which optical fibers contained therein could be accessible via the gap between adjacent network modules (see, e.g., FIG. 8), bridge 300 has a base portion, generally designated 310, and a rear cover, generally designated 320.

FIG. 6 illustrates one example embodiment of a bridge, generally designated 300. As noted above, bridge 300 has two main parts: a base portion, generally designated 310, and a removable rear cover, generally designated 320. Base portion 310 has a front wall 312 and two side walls 314, which are formed integrally with front wall 312 and extend in a plane that is substantially orthogonal (e.g., 90°+/−10°, 5°, 2°, or 1°) to front wall 312. As was discussed relative to bridge 200 relative to FIG. 5, side walls 314 may be formed inwards from the perimeter of front wall 312, in a manner that would allow for front wall 312 to protrude beyond one or both side walls 314, thus forming a structural flange for gripping and increased ruggedness. As can be seen in FIG. 8, side walls 314 are configured to contact first or second angled surfaces 124 and 126 of adjacent breakout boxes 100 and, therefore, have a profile and/or angle similar to an angle of the plane defined by the first or second angled surface of the adjacent breakout box 100. Rear cover 320 has a rear wall 326, which is in a plane that is substantially parallel to the plane defined by front wall 312, and side flange portions 328, which extend away from rear wall 326 in a plane that is substantially orthogonal (e.g., 90°+/−10°, 5°, 2°, or 1°) to rear wall 326 and is substantially parallel (e.g., within 10°, 5°, 2°, or 1° to a plane defined by side walls 314. Rear cover 320 is configured to be attached to base portion 310*by*, for example and without limitation, one or more threaded holes 328H, which are disposed on and/or formed integrally through a thickness of side flange portions 328 of rear cover 320, and screws 322 which pass through holes 314H that are disposed on and/or integrally formed through a thickness of side walls 314 of base portion 310, thus clamping each side wall 314 against a respective side flange portion 328 by threadably engaging each screw 322 with and/or into a corresponding hole 328H to assemble base portion 310 and rear cover 320. Bridge 300 also is configured for attachment to one or more (e.g., at least two, or a plurality of) breakout boxes 100 (see, e.g., FIG. 8). In the example embodiment in FIG. 6, tabs 324 are integrally formed on and/or from a portion of each side wall 314 of base portion 310. Tabs 324 are arranged so as to be substantially orthogonal (e.g., 90°+/−10°, 5°, 2°, or 1°) to a plane defined a side walls 314 to which each tab 324 is respectively attached, and are substantially parallel to a plane of the first or second angled surface (see, e.g., 124 and 126, FIGS. 2, 3, and 8). Tabs 324 have holes 324H formed therein (e.g., through a thickness of tab 324). Holes 324H are located so as to be substantially aligned with threaded holes (see, e.g., 126H, FIG. 3) formed in angled surfaces 124 and 126 of breakout box 100 (see, e.g., FIG. 7B) and are secured to an adjacent breakout box 100 by threadably engaging a screw 122 through each hole 324 in each tab 324 and into threaded holes (see, e.g., 126H, FIG. 3) of the adjacent breakout box 100 (see, e.g., FIG. 7B). Other types of fasteners and types of attachment will be readily understood by those having ordinary skill in the art.

FIGS. 7A-7B depict breakout box systems, generally designated 500 and 500', respectively, to illustrate the installation of bridges 200 and 300, respectively, in an installed position between two breakout boxes 100. Breakout box system 500 uses bridge 200 as a connection between two breakout boxes 100. Breakout system 500' uses bridge 300 as a connection between two breakout boxes 100.

Referring to FIG. 8, a method of deploying breakout box system 500' is shown via an exploded view. The method includes the steps of: mounting base section 110 onto one or more (e.g., a plurality of) network modules M by screws (see, e.g., 122, FIG. 2), as previously described hereinabove; inserting an optical fiber cable bundle 900 into cover 120 through ferrule 130; separating the Optical fiber cable bundle 900 into fiber groups 910, 920, 930 for each network module M; extending the fiber groupings through their respective exit openings 116 into a corresponding network module M, to be terminated as desired within each network module M; feeding optical fibers that are not designated for the first grouping of network modules M through second opening 134; arranging within base section 110 and fitting cover 120 onto base section 110 to be fixedly attached thereto; and tightening ferrule 130 to prevent cable 900 from moving relative thereto.

In a further embodiment of the method, these steps can be repeated with a second breakout box 101, which does not have a ferrule 130 disposed thereon, but is otherwise substantially identical to breakout box 100. Second breakout box 101 is configured to be connected, mounted, or otherwise attached to one or more additional network modules M. According to this further embodiment, the method includes the steps of attaching a bridge 200 or 300 to and between breakout box 100 and breakout box 101. and connecting breakout box 100 and breakout box 101 by either bridge 200 or bridge 300.

The step of installing bridge 200 includes the steps of: inserting bridge 200 between breakout box 100 and breakout box 101 to cover optical cables that are exposed and/or disposed therebetween and threadably engaging a screw 122 through each of a plurality of holes 224H formed in tabs 224 of bridge 200 (see, e.g., FIG. 5) and into a corresponding hole 124H or 126H of breakout box 100 or 101 (see, e.g., FIGS. 2 and 3), thus securing and/or attaching (e.g., in a removable manner) bridge 200 to each of breakout box 100 and breakout box 101.

The step of installing bridge 300 includes the steps of: inserting base portion 310 between breakout box 100 and breakout box 101 to cover, on at least one side, optical cables that are exposed and/or disposed therebetween; threadably engaging a screw 122 through each of a plurality of holes 324H formed in tabs 324 of base portion 310 (see, e.g., FIG. 6) and into a corresponding hole 124H or 126H of breakout box 100 or 101 (see, e.g., FIGS. 2 and 3), thus securing and/or attaching (e.g., in a removable manner) base portion 310 to each of breakout box 100 and breakout box 101; attaching rear cover 320 to base portion 310 by threadably engaging screws 322 through holes 314H and into holes 328H, thus securing and/or attaching (e.g., in a removable manner) rear cover 320 to base portion 310. In some embodiments, both base portion 310 and rear cover 320 may be attached to one or both of breakout box 100 and/or breakout box 101, whether by threadable engagement of screws 122 or any other suitable type of attachment, such as, for example, deformable tabs being inserted into slots for retention.

In some such embodiments, the method may include repeating the steps for installing and distributing optical fibers into and/or through a plurality of breakout boxes 101. In these embodiments, bridge 200 or 300 may be installed between two breakout boxes 101.

In some embodiments. a protective mesh sleeve 400 can be applied to one or more (e.g., all, or a plurality of) fiber groups 910, 920, 930 prior to the step of feeding fiber groups 910, 920, 930 into a respective network module M via a corresponding exit hole 116.

While the subject matter has been described herein with reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claimed elements.

What is claimed is:

1. A breakout box for optical fibers, the breakout box comprising:
   a base section configured to be connected to a plurality of network modules in a network rack;
   a removable cover for attaching to the base section;
      first and second angled surfaces comprising at least a first opening on the first angled surface; and
      a central surface disposed between the first and second angled surfaces,
   wherein the base section comprises a plurality of exit openings for passage of one or more optical fibers into the plurality of network modules.

2. The breakout box of claim 1, comprising a threaded ferrule disposed on and/or in, at least partially, the first opening, wherein the ferrule is configured to receive an optical fiber cable bundle therethrough.

3. The breakout box of claim 1, comprising a protective insert in at least one of the plurality of exit openings.

4. The breakout box of claim 1, comprising a second opening formed on the second angled surface, wherein a plug or protective insert is disposed on and/or in, at least partially, the second opening.

5. The breakout box of claim 1, wherein the base section comprises side walls and a rear wall, and wherein the plurality of exit openings are disposed in the rear wall.

6. The breakout box of claim 1, wherein the plurality of exit openings comprise three exit openings for passage of one or more optical fibers to each of three rack modules through a corresponding one of the three exit openings.

7. The breakout box of claim 1, wherein the ferrule receives an optical fiber cable with 864 optical fibers therein.

8. A breakout box system for optical fibers, the breakout box system comprising:
at least first and second breakout boxes, each breakout box comprising:
a base section configured to be connected to a plurality of network modules in a network rack;
a removable cover for attaching to the base section;
first and second angled surfaces comprising first and second openings, respectively; and
a central surface disposed between the first and second angled surfaces,
wherein the base section comprises a plurality of exit openings for passage of one or more optical fibers into the plurality of network modules; and
at least one bridge configured to connect the first and second breakout boxes so that optical fibers housed within are substantially fully enclosed,
wherein the first opening of the first and/or second breakout box is configured for receiving an optical fiber cable bundle.

9. The breakout box system of claim 8, wherein the at least one bridge comprises side walls and a front wall, and wherein the side walls are configured to match the first or second angled surfaces of the breakout box.

10. The breakout box system of claim 9, wherein the at least one bridge comprises a removable rear cover configured to attach to the side walls of the bridge, so that the at least one bridge fully encloses optical fibers disposed between the first and second breakout boxes.

11. The breakout box system of claim 10, wherein the first and second breakout boxes are spaced apart by more than 0 Rack Units (0 RU) therebetween.

12. The breakout box system of claim 8, comprising one or more protective sleeves for covering the one or more optical fibers passing into the plurality of network modules through a corresponding one of the plurality of exit openings.

13. The breakout box system of claim 8, comprising a plurality of breakout boxes and a plurality of bridges, wherein at least one of the plurality of bridges is installed between each adjacent breakout box of the plurality of breakout boxes.

14. The breakout box system of claim 8, wherein the breakout box system is connected and/or mounted at a rear or side corner of a network rack.

15. A method of routing optical fibers to network modules in a network rack, the method comprising:
providing a first breakout box, wherein the first breakout box comprises:
a base section configured to be connected to one or more network modules; and
a removable cover for attaching to the base section, the removable cover comprising:
first and second angled surfaces comprising at least a first opening on the first angled surface;
a central surface disposed between the first and second angled surfaces; and
a threaded ferrule disposed on the first opening,
wherein the ferrule is configured to receive an optical fiber cable bundle,
wherein the base section has one or more exit openings;
mounting the base section to the one or more network modules;
feeding the optical fiber cable bundle through the ferrule;
separating one or more optical fibers from the optical cable bundle;
passing at least one of the one or more separated optical fibers through at least one of the one or more exit openings and into a corresponding network module;
terminating the one or more optical fibers within the network modules;
attaching the removable cover to the base section; and
tightening the ferrule.

16. The method of claim 15, comprising, after separating the one or more optical fibers from the optical cable bundle, feeding the optical fiber cable bundle through the second opening.

17. The method of claim 15, comprising:
providing a second breakout box, wherein the second breakout box comprises:
a base section configured to be connected to one or more additional network modules; and
a removable cover for attaching to the base section, the removable cover comprising:
first and second angled surfaces comprising at least a first opening on the first angled surface; and
a central surface disposed between the first and second angled surfaces; and
wherein the base section has one or more exit openings;
mounting the base section of the second breakout box to the one or more additional network modules;
providing at least one bridge comprising a base portion comprising side walls and a front wall;
feeding the optical fiber cable bundle through the first opening of the second breakout box;
separating one or more optical fibers from the optical cable bundle;
passing at least one of the one or more separated optical fibers through at least one of the one or more exit openings of the second breakout box and into a corresponding network module of the additional network modules; and
terminating the one or more optical fibers within the additional network modules;
attaching the removable cover to the base section; and
connecting the at least one bridge to the first and second breakout boxes such that the optical fiber cable bundle disposed therebetween is substantially fully enclosed within.

18. The method of claim 17, wherein connecting the at least one bridge comprises connecting the base portion to the first and second breakout boxes, respectively.

19. The method of claim 17, comprising attaching a removable rear cover of the at least one bridge to the side walls of the bridge to substantially fully enclose the optical cable bundle disposed between the first and second breakout boxes.

20. The method of claim 15, comprising enclosing one or more of the separated optical fibers in a protective mesh sleeve.

21. The method of claim 15, comprising inserting a protective insert into at least one of the one or more exit openings to protect optical fibers passing therethrough.

22. A method of routing optical fibers to network modules in a network rack, the method comprising:
providing a first breakout box, wherein the first breakout box comprises:
a base section configured to be connected a plurality of network modules;
a removable cover for attaching to the base section;
first and second angled surfaces comprising at least a first opening on the first angled surface;

a central surface disposed between the first and second angled surfaces; and a threaded ferrule disposed on the first opening, wherein the ferrule is configured to receive an optical fiber cable bundle, wherein the base section comprises one or more exit openings;

mounting the base section to the plurality of network modules;

feeding the optical fiber cable bundle through the ferrule;

separating one or more optical fibers from the optical cable bundle;

passing at least one of the one or more separated optical fibers through at least one of the plurality of exit openings and into a corresponding network module;

terminating the one or more optical fibers within the corresponding network modules; and attaching the removable cover to the base section.

* * * * *

UNITED STATES PATENT AND TRADEMARK OFFICE
CERTIFICATE OF CORRECTION

PATENT NO. : 10,048,452 B1
APPLICATION NO. : 15/826188
DATED : August 14, 2018
INVENTOR(S) : Hangebrauck et al.

It is certified that error appears in the above-identified patent and that said Letters Patent is hereby corrected as shown below:

In the Claims

In Claim 1, Column 8, Line 37 should read:
...the breakout box comprising:
a base section configured to be connected to a plurality of
    network modules in a network rack;
a removable cover for attaching to the base section;
first and second angled surfaces comprising at least a first opening on the first
    angled surface; and
a central surface disposed between the first and second angled surfaces,
wherein the base section comprises...

In Claim 8, Column 9, Line 3 should read:
...each breakout box comprising:
a base section configured to be connected to a plurality of
    network modules in a network rack;
a removable cover for attaching to the base section;
first and second angled surfaces comprising first and
    second openings, respectively; and
a central surface disposed between the first and
    second angled surfaces, Signed and Sealed this
Ninth Day of April, 2019

Andrei Iancu
*Director of the United States Patent and Trademark Office*